Aug. 28, 1956 M. W. KENNEY 2,760,780

TRANSFER ARM FOR AUTOMATIC PHONOGRAPHS

Filed Aug. 9, 1951 3 Sheets-Sheet 1

Inventor
Mahlon W. Kenney
By John F. Eakins
Attorney

TRANSFER ARM FOR AUTOMATIC PHONOGRAPHS

Inventor
Mahlon W. Kenney
By John F. Eakins
Attorney

Aug. 28, 1956 M. W. KENNEY 2,760,780

TRANSFER ARM FOR AUTOMATIC PHONOGRAPHS

Filed Aug. 9, 1951 3 Sheets-Sheet 3

Inventor
Mahlon W. Kenney
By John F. Eakins
Attorney 2,760,780

TRANSFER ARM FOR AUTOMATIC PHONOGRAPHS

Mahlon W. Kenney, Oak Park, Ill., assignor to J. P. Seeburg Corporation, Chicago, Ill., a corporation of Illinois Application August 9, 1951, Serial No. 240,996

8 Claims. (Cl. 274—1)

This invention relates to automatic phonographs and particularly to such phonographs in which a transfer arm enters between spacers of a record magazine to effect transfer of a record housed therein. In such phonographs, the transfer arm is aligned selectively with one of the record spaces and is then moved into such space.

One of the principal objects of the invention is to provide an improved transfer arm and magazine so that proper cooperation between the transfer arm, the spacers and the record is insured.

The invention will readily be understood from the following description of a preferred embodiment thereof, taken in conjunction with the accompanying drawings. It is to be noted that this embodiment is applicable to the type of phonograph described and claimed in Reissue Patent No. 22,551 and Patents Nos. 2,281,548, 2,323,365 and 2,458,496, in which the record is played in a vertical position and is clamped to the turntable, but will readily be understood that it is equally applicable to all phonographs in which the records are housed individually in a magazine and are removed therefrom by a transfer arm which enters the magazine spaces.

In the type of phonograph illustrated, the magazine is stationary and the transfer arm, turntable and player arm are carried by a movable carriage which is selectively positioned relative to the magazine so that the transfer arm is located in alignment with the record space of the selected record. The transfer arm moves upwardly and rolls the record along a ramp towards playing position. In case the transfer arm is momentarily held, it tends to snap the record upwardly and out of the machine. I provide simple means to prevent the escape of the record so that it is retained on the ramp and is moved correctly toward playing position by the released transfer arm. In the drawings:

Figures 1, 5:
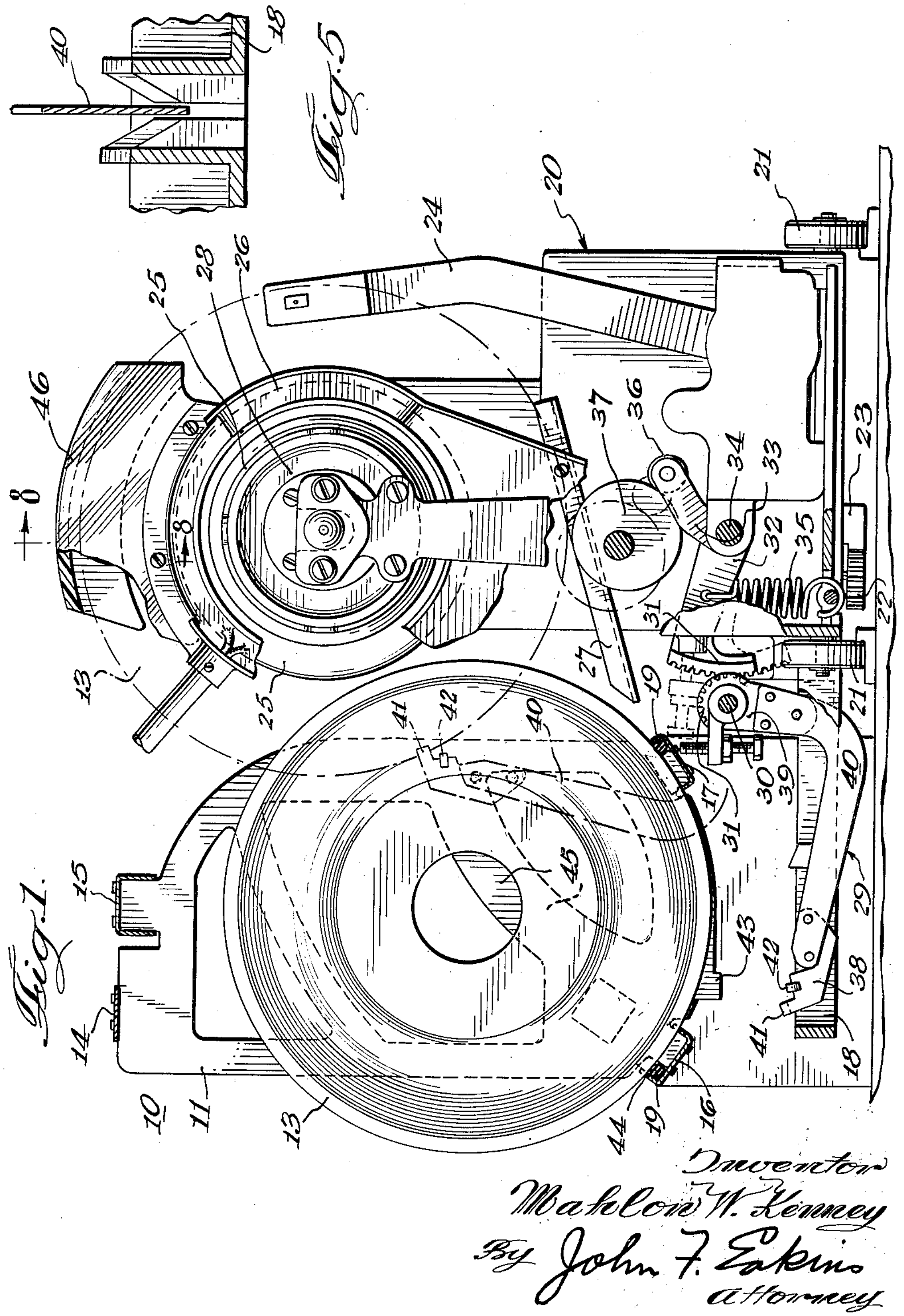
Figure 1 is a diagrammatic elevational view, partly in section, of a phonograph embodying my invention.
Fig. 5 is a sectional detail view, the section being taken on the line 5—5 of Fig. 4.
Figures 2, 9:
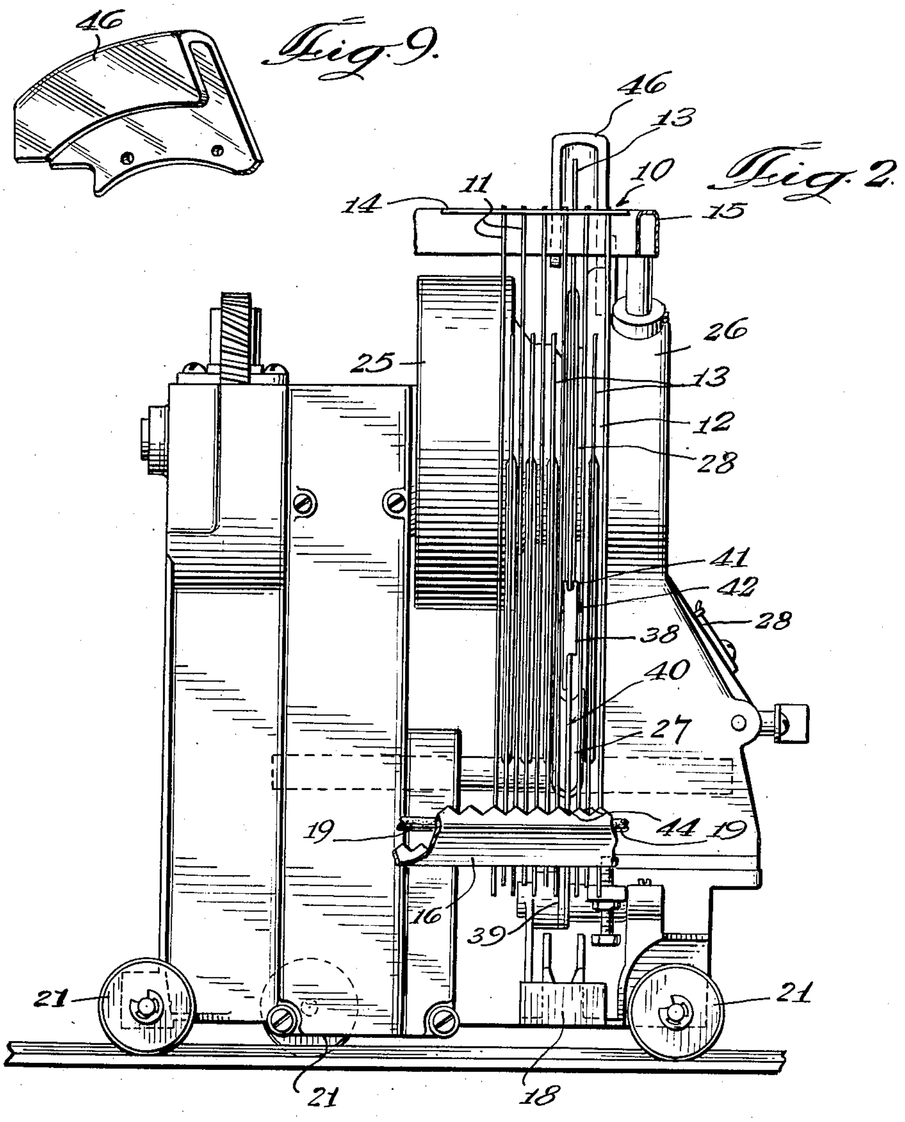
Fig. 2 is a rear elevational view thereof, with most of the magazine broken away.
Fig. 9 is a perspective view of the retaining member.
Figure 7:
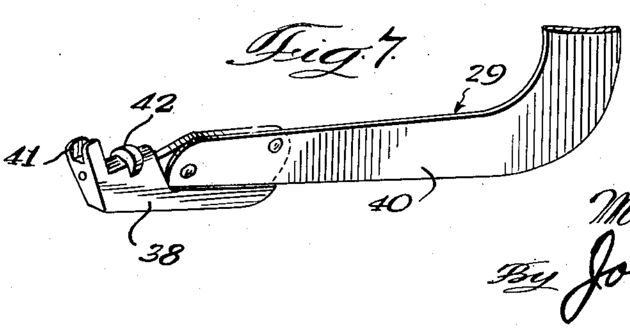
Fig. 7 is a fragmentary perspective view of the transfer arm.

The magazine 10 comprises a series of equally spaced spacers 11, providing individual pockets 12 for records 13. The spacers are connected by bars 14, 15, 16 and 17 to constitute a rigid stationary magazine. The bars 16 and 17 are channels and receive rubber cords 19 on which the records 13 rest as shown in Fig. 1.

The record is played on a carriage 20 which is mounted on rollers 21 for movement back and forth in front of the magazine. The carriage 20 is thus driven by a pinion 22 and a stationary rack 23. The carriage 20 carries a player arm 24, a turntable 25 and a stripper ring 26. The stripper ring is spaced from the turntable to receive between them a record transferred from the magazine along a ramp 27 which is located below the ring and turntable and in alignment with the record space therebetween. It will be understood that the record is clamped to the turntable by a record gripper 28 which operates through the stripper ring and elevates the record away from the ramp 27 and the record elevating means hereinafter described.

The record is elevated from its normal magazine position shown in full lines in Fig. 1 by means of a transfer lever 29 pivotally mounted in alignment with the ramp 27 and the space between the turntable and stripper ring, on the carriage 20 at 30. This lever is provided with a pinion formation 31 which meshes with a sector 32 of a lever 33 which is pivotally mounted on the carriage 20 at 34. A spring 35 connected to the lever 33 tends to move the transfer lever upwardly. The lever 33 carries a roller 36 which is biased against the cam 37 by the spring 35.

In the normal position of the cam 37, shown in Fig. 1, the transfer lever 29 is located in a housing 18 below the magazine so that the carriage 20 can be driven from one selecting position to another. When the cam 37 is driven in either direction, the transfer lever 29 swings upwardly through the magazine record space with which it is aligned and elevates the record in that space, rolling it along the ramp 27, towards the position shown in phantom in Fig. 1. The record gripper 28 is then actuated to complete the mounting of the record and move it clear of the transfer arm 29 and the ramp 27. When the record is played and released by the record gripper 28, it engages the ramp 27 and transfer arm 29. The cam 37 makes another half revolution so that the transfer arm 29 is moved back to its normal position leading the played record back to its space in the magazine.

The carriage is arrested at a precise position for each record by selector means (not shown) and the magazine is located so that the corresponding magazine record space is aligned with the transfer arm 29, the ramp 27 and the record receiving spacer between the turntable 25 and the stripper ring. It is desired to keep the magazine record space small to keep the size of the machine small and it is difficult to maintain high precision in production in the magazine spacing with a large number of records. I have provided a new spacer and a new transfer arm which permit close record spacing without a corresponding high degree of precision in the magazine structure.

Figure 3:
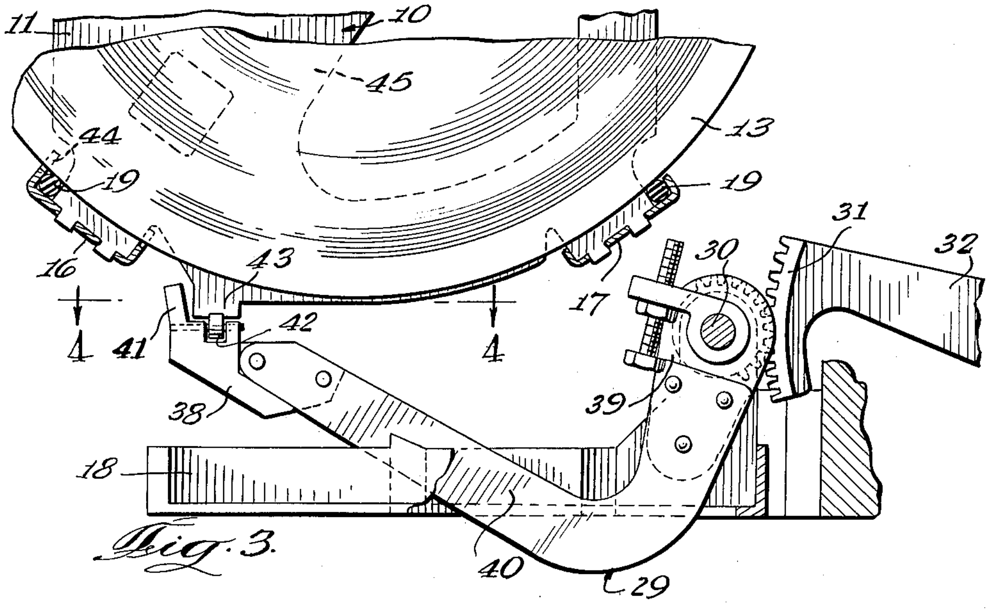
Fig. 3 is a sectional elevational detail view showing the manner in which the transfer arm enters the magazine.
Figure 4:
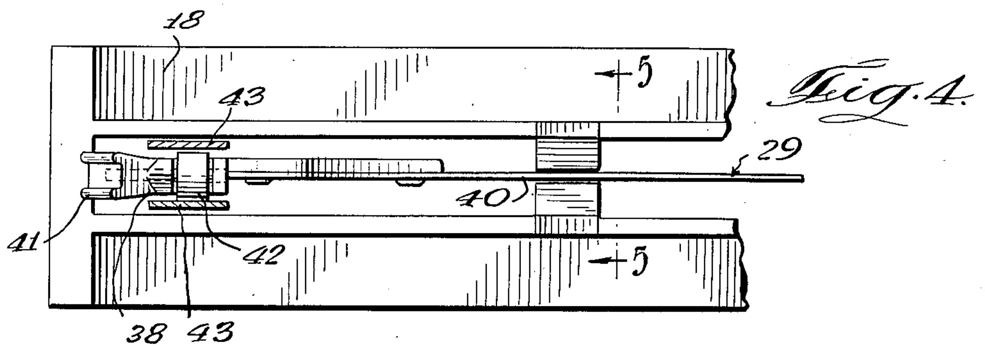
Fig. 4 is a fragmentary sectional plan view, taken on the line 4—4 of Fig. 3, showing the transfer arm in its housing.
Figure 6:
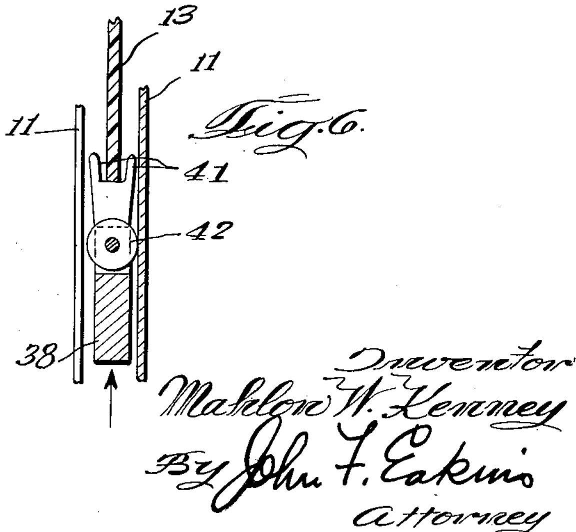
Fig. 6 is a sectional elevational view showing the manner in which the transfer arm head cooperates with the spacers and the record.

For this purpose I make the transfer arm 29 of three parts, a head 38, a pivoted boss portion 39 which carries the gear formation 31, and a major resilient portion 40 which is preferably a piece of spring steel. The head 38 and boss 39 are preferably secured to the resilient portion 40 by means of rivets. The head is provided with a fork 41 for the reception of the edge of the record and is also provided with a roller 42, whose axis is directed towards the pivot 30. As best seen in Fig. 6, the roller 42 is slightly smaller than the distance between the spacers 11 and the width of the fork, the widest part of the head, is slightly less than the diameter of the roller. Thus, the roller may contact either of the two adjacent spacers 11 and maintain the rest of the head out of contact therewith. The record engages the fork 41 and does not engage the roller 42. Further, the roller 42 must enter between the spacers 11 before the fork 41. To attain the first of these objects, I mount the roller lower on the head than the fork 41, as best seen in Figs. 1 and 3, and to attain the second of these objects, I provide each spacer 11 with a depending tab 43 in the path of the roller 42, the tab being sufficiently deep to ensure entry of the roller 42 between adjacent tabs before the fork enters between the spacers carrying these tabs or engages the record. It is to be noted that the upturned rear lip of the bar 16, which is adjacent the point of entry of the fork 41 into the magazine, is provided with V-shaped notches 44 which center the adjacent portions of the records in their magazine spaces.

While the spacers 11 may be provided with several cut-outs in the interest of lightness, a continuous web 45 is provided on each spacer from the tab 43 along the path of the roller 42.

It will readily be understood that when the arm 29 moves upwardly, it may be presented perfectly to the space 12 between two spacers 11, in which case the head 38 will move through this space, making contact only with the record being raised. If, however, the spacers are displaced slightly to the right as viewed in Fig. 6, then the roller 42 will engage the tab 43 of the right hand spacer and the head will be cammed to the left, the roller 42 riding on the right hand spacer. The fork 41 will then enter freely between the spacers and engage the record 13 which is centered by the notch 44. The arm continues to elevate the roller 42 riding on the web 45 of the right hand spacer.

Figure 8:
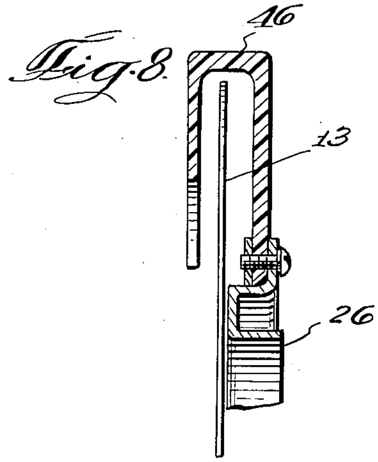
Fig. 8 is a fragmentary sectional elevational view showing the relation of the retaining member to a playing record.

I prefer to provide a retaining member 46 to prevent removal of the record from the front of the machine. This member may suitably take the form of an arcuate channel located above the record playing position. The channel may suitably be made of plaster and may be mounted on the stripping ring 26, as seen in Fig. 1. In case the transfer arm is held momentarily and is suddenly released, the record will not be thrown out of the machine. It will merely roll up the ramp 27, strike the retaining member 46 and roll back into engagement with the fork 41 for proper placement on the turntable. In normal operation the record does not contact the member 46, but remains in spaced relation thereto as shown in Fig. 8.

It is to be noted that the record does not completely emerge from its magazine record space, as best seen in Fig. 1, so that return of the played record to its place in the magazine is ensured.

The housing 18 is preferably provided with cam formations 47 which assist in the return of the transfer lever to its normal position, particularly if it has become held in some manner.

Although the invention has been described in connection with the specific details of a preferred embodiment thereof, it must be understood that such details are not intended to be limitative of the invention except as recited in the accompanying claims.

Having thus described my invention, I declare that what I claim is:

1. In combination, a record magazine having a plurality of record spacers, adjacent record spacers providing, between them, individual spaces for records, a transfer arm arranged for alignment with a record space, a relatively enlarged record engaging member on said arm, said arm being resilient in the transverse direction of the record space, means for moving said arm to effect displacement of the record therein at least part way out of the magazine, and cam means on said arm arranged to engage one of said spacers, in the event of slight misalignment, to effect a slight displacement of the arm to ensure entry of the arm and the record engaging member into the record space, said cam means, record engaging means and spacers being correlated so that the cam means enters between adjacent spacers before the record engaging means contacts the record therebetween.

2. In combination, a record magazine having a plurality of record spacers, adjacent record spacers providing, between them, individual spaces for records, a transfer arm arranged for alignment with a record space, a relatively enlarged record engaging member on said arm, said arm being resilient in the transverse direction of the record space, means for moving said arm to effect displacement of the record therein at least part way out of the magazine, and cam means on said arm wider than said arm and record engaging member and arranged to engage one of said spacers, in the event of slight misalignment, to effect a slight displacement of the arm to ensure entry of the arm and the record engaging member into the record space, each of said spacers having a continuous track on which said cam means may ride during the travel of the arm within the record space to maintain substantial centering of said engaging portion when the arm is within the record space, said cam means, record engaging means and spacers being correlated so that the cam means enters between adjacent spacers before the record engaging means contacts the record therebetween.

3. In combination, a record magazine having a plurality of record spacers, adacent record spacers providing, between them, individual spaces for records, a transfer arm arranged for alignment with a record space, said arm being resilient in the transverse direction of the record space, a relatively enlarged record engaging portion on said arm, and a cam member adjacent said record engaging portion, said cam member being wider than the arm and the record engaging portion and being further removed from the record in the space than the record engaging portion so that only the record engaging portion engages the record, said spacers being configured so that the cam means enters between them before the record engaging portion, said cam means being arranged, to engage one of said spacers, in the event of slight misalignment, to effect a slight displacement of the arm to ensure correct entry of the record engaging portion into said record space.

4. In combination, a record magazine having a plurality of record spacers, adjacent record spacers providing, between them, individual spaces for records, a transfer arm arranged for alignment with a record space, said arm being resilient in the transverse direction of the record space, a relatively enlarged record engaging portion on said arm, and a cam member adjacent said record engaging portion, said cam member being wider than the arm and the record engaging portion and being further removed from the record in the space than the record engaging portion so that only the record engaging portion engages the record, said spacers being configured so that the cam means enters between them before the record engaging portion, said cam means being arranged, to engage one of said spacers, in the event of slight misalignment, to effect a slight displacement of the arm to ensure correct entry of the record engaging portion into said record space, each of said spacers having a continuous track on which said cam means may ride during the travel of the arm within the record space to maintain substantial centering of said portion when within the record space.

5. In combination, a record magazine having a plurality of record spacers, adjacent spacers providing, between them, individual spaces for records, a transfer arm arranged for alignment with a record space, said arm being resilient in the transverse direction of the record space, said arm having a relatively enlarged record engaging fork and cam means, said fork being slightly narrower than the cam means and said cam means being slightly narrower than the record space, means for moving said arm into the record space to displace said record, means on the magazine centering the record in its space adjacent the point of entry of said fork, said cam means being arranged to engage a spacer, in case of slight misalignment, flex the arm so that the fork correctly enters the record space to engage the record therein, said cam means, record engaging means and spacers being correlated so that the cam means enters between adjacent spacers before the record engaging means contacts the record therebetween.

6. In combination, a record magazine having a plurality of record spacers, adjacent spacers providing, between them, individual spaces for records, a transfer arm arranged for alignment with a record space, said arm being resilient in the transverse direction of the record space, said arm having a relatively enlarged record engaging fork and cam means, said fork being slightly narrower than the cam means and said cam means being slightly narrower than the record space, means for moving said arm into the record space to displace said record, means on the magazine centering the record in its space adjacent the point of entry of said fork, said cam means being arranged to engage a spacer, in case of slight misalignment, flex the arm so that the fork correctly enters the record space to engage the record therein, each of said spacers having a continuous track on which said cam means may ride during the travel of the arm within the record space to maintain substantial centering of said fork when the arm is within the record space, said cam means, record engaging means and spacers being correlated so that the cam means enters between adjacent spacers before the record engaging means contacts the record therebetween.

7. In combination, a record magazine having a plurality of record spacers, adjacent spacers providing, between them, individual spaces for records, a transfer arm arranged for alignment with a record space, said arm being resilient in the transverse direction of the record space, said arm having a relatively enlarged record engaging fork and cam means, said fork being slightly narrower than the cam means and said cam means being slightly narrower than the record space, means for moving said arm into the record space to displace said record, means on the magazine centering the record in its space adjacent the point of entry of said fork, said cam means being located further from the record than the fork and said spacers being configured so that the cam means enters, between the spacers before the fork enters, therebetween, said cam means being arranged to engage a spacer, in case of slight misalignment, flex the arm so that the fork correctly enters the record space to engage the record therein.

8. In combination, a record magazine having a plurality of record spacers, adjacent spacers providing, between them, individual spaces for records, a transfer arm arranged for alignment with a record space, said arm being resilient in the transverse direction of the record space, said arm having a relatively enlarged record engaging fork and cam means, said fork being slightly narrower than the cam means and said cam means being slightly narrower than the record space, means for moving said arm into the record space to displace said record, means on the magazine centering the record in its space adjacent the point of entry of said fork, said cam means being located further from the record than the fork and said spacers being configured so that the cam means enters, between the spacers before the fork enters, therebetween, said cam means being arranged to engage a spacer, in case of slight misalignment, flex the arm so that the fork correctly enters the record space to engage the record therein, each of said spacers having a continuous track on which said cam means may ride during the travel of the arm within the record space to maintain substantial centering of said fork when within the record space.

References Cited in the file of this patent

UNITED STATES PATENTS

| | | |
|---|---|---|
| 1,868,846 | Oyston | July 26, 1932 |
| 2,281,548 | Andrews | May 5, 1942 |
| 2,340,418 | Gabel | Feb. 1, 1944 |
| 2,458,496 | Andrews | Jan. 11, 1949 |
| 2,616,706 | Maurer | Nov. 4, 1952 |